United States Patent
Jungen et al.

(10) Patent No.: US 9,545,890 B2
(45) Date of Patent: Jan. 17, 2017

(54) SENSOR MAT COMPRISING TWO SWITCHING LEVELS

(75) Inventors: Dietmar Jungen, Mehren (DE); Andreas Steier, Pellingen (DK)

(73) Assignee: IEE International Electronics & Engineering S.A., Echternach (LU)

( * ) Notice: Subject to any disclaimer, the term of this patent is extended or adjusted under 35 U.S.C. 154(b) by 820 days.

(21) Appl. No.: 11/813,183

(22) PCT Filed: Dec. 22, 2005

(86) PCT No.: PCT/EP2005/057087
§ 371 (c)(1),
(2), (4) Date: Jun. 29, 2007

(87) PCT Pub. No.: WO2006/072551
PCT Pub. Date: Jul. 13, 2006

(65) Prior Publication Data
US 2008/0204213 A1    Aug. 28, 2008

(30) Foreign Application Priority Data

Jan. 3, 2005  (DE) .................... 20 2005 000 018 U

(51) Int. Cl.
*B60Q 1/00* (2006.01)
*B60R 21/015* (2006.01)
*G01V 9/00* (2006.01)

(52) U.S. Cl.
CPC ........... *B60R 21/01532* (2014.10); *G01V 9/00* (2013.01)

(58) Field of Classification Search
CPC ..................... B60R 2022/4858; B60R 21/015; B60R 2021/01516; B60R 2021/0157; B60R 2021/01575; B60R 2021/022

USPC ......... 340/438, 436, 667, 425.5, 457, 457.1; 701/45, 36, 1; 73/862.473, 862.471, 73/862.451, 862.391, 862.381, 862, 73/862.041, 862.046, 862.07, 45, 46; 180/271–290
See application file for complete search history.

(56) References Cited

U.S. PATENT DOCUMENTS

| | | | | |
|---|---|---|---|---|
| 5,570,903 A | * | 11/1996 | Meister | ........... B60N 2/002 180/273 |
| 6,366,200 B1 | | 4/2002 | Aoki | |
| 6,450,046 B1 | | 9/2002 | Maeda | |
| 6,825,765 B2 | * | 11/2004 | Stanley | ........... B60N 2/002 280/735 |

(Continued)

FOREIGN PATENT DOCUMENTS

| EP | 1491408 A1 * 12/2004 |
|---|---|
| EP | 1492136 A1 * 12/2004 |

(Continued)

OTHER PUBLICATIONS

International Search Report: PCT/EP2005/057087; Feb. 28, 2006.

*Primary Examiner* — An T Nguyen
(74) *Attorney, Agent, or Firm* — Reising Ethington P.C.

(57) ABSTRACT

Disclosed is a sensor mat for determining a seat occupation situation of a vehicle seat. Said sensor mat comprises a plurality of sensor cells which can be allocated to a sitting area of the vehicle seat and are configured and interconnected in such a way that an output signal of the sensor mat varies in accordance with the seat occupation situation. At least one first sensor cell and a second sensor cell are interconnected to a pair of sensor cells such that the output signal of the sensor mat exceeds or lies below a predefined threshold value independently of the triggering state of the other sensor cells when the first and the second sensor cell are triggered simultaneously.

11 Claims, 3 Drawing Sheets

(56) References Cited

U.S. PATENT DOCUMENTS

| | | | | |
|---|---|---|---|---|
| 7,161,460 B2* | 1/2007 | Federspiel | ............ | H01H 13/702 200/310 |
| 7,365,549 B2* | 4/2008 | Karges | ............... | G01G 19/4142 324/691 |
| 7,464,613 B2* | 12/2008 | Bieck | ........................ | G01L 1/20 73/862.632 |
| 7,543,510 B2* | 6/2009 | Bieck et al. | ..................... | 73/862 |
| 7,595,735 B2* | 9/2009 | Henze | ................ | B60R 21/01524 280/735 |
| 2002/0021136 A1* | 2/2002 | Pietsch | .................. | B60N 2/002 324/691 |
| 2002/0195016 A1* | 12/2002 | Darraba | ................ | B60R 21/017 102/201 |
| 2003/0023414 A1* | 1/2003 | Lich | ....................... | B60N 2/002 703/2 |
| 2005/0072249 A1* | 4/2005 | Maeda | ................... | B60N 2/002 73/862.046 |
| 2006/0150752 A1* | 7/2006 | Lorenz | .............. | B60R 21/01516 73/862.046 |
| 2007/0056385 A1* | 3/2007 | Lorenz | ................ | H01H 13/702 73/818 |

FOREIGN PATENT DOCUMENTS

| | | |
|---|---|---|
| EP | 1 510 802 | 3/2005 |
| JP | 11 297153 | 10/1999 |

* cited by examiner

SENSOR MAT COMPRISING TWO SWITCHING LEVELS

TECHNICAL FIELD OF THE INVENTION

The present invention relates generally to a sensor mat for determining a seat occupation situation for a vehicle seat.

BRIEF DISCUSSION OF RELATED ART

Seat occupation sensors have been used for a considerable time for controlling airbags in vehicles. These seat occupation sensors are used to determine an occupation state of a vehicle seat and the airbag or airbags which are assigned to the seat are activated only if the instantaneous occupation state requires such triggering. These seat occupation sensors generally have a plurality of switching elements, for example pressure sensors, which are arranged distributed in the seating area of the vehicle seat. An evaluation unit which is connected to the seat occupation sensor interrogates the switched state of the individual switching elements and determines an occupational state of the seat from the respective switched states. If the seat is occupied by a person, a plurality of the switching elements are triggered on the basis of the force due to weight exerted on the seat by a person, a state which is recognized by the connected evaluation circuit as an occupied state of the seat and communicated to the airbag controller.

In order to permit reliable triggering of the airbags which are assigned to the vehicle seat, such a seat occupation sensor must be configured in such a way that even slight triggering of the sensor mat is detected by the evaluation unit as occupation of the seat so that the corresponding airbags are activated in the event of a crash. For this purpose, the sensor mat must be highly dynamic so that it is possible to distinguish in a sensitive way between different seat occupation situations.

For non-safety-critical applications such as, for example, in a seat-belt warning system, such sensitive detection of the seat occupation is not necessary or not desired. Such a warning system outputs, for example, an audible or visible signal if the vehicle seat is occupied without the seat-belt lock of the associated seat-belt being clicked in. The seat occupation sensor in such a system must essentially make it possible to differentiate between seat occupation by a passenger and seat occupation by a lightweight object such as, for example, a handbag. The intention is that for this purpose the seat occupation sensor will preferably bring about a uniquely defined change in the signal starting from a certain triggering level, which change counts as a switching threshold for the connected evaluation unit.

The requirements which were made of a seat occupation sensor for a seat-belt warning system accordingly differ significantly from the requirements made of a sensor mat for controlling an airbag. If a single sensor mat is to be used both for controlling an airbag and in a seat-belt warning system, these different requirements constitute a considerable problem when configuring the sensor mat.

BRIEF SUMMARY OF THE INVENTION

The invention proposes a sensor mat which permits combined use.

Such a sensor mat for determining a seat occupation situation for a vehicle seat comprises a plurality of sensor cells which can be assigned to a seating area of the vehicle seat, wherein the sensor cells are configured and connected to one another in such a way that an output signal of the sensor mat varies as a function of the seat occupation situation. According to the invention, at least a first sensor cell and a second sensor cell are connected to form a sensor cell pair in such a way that when the first and second sensor cells are triggered simultaneously the output signal of the sensor mat exceeds or drops below a predefined threshold value independently of the triggering state of the other sensor cells.

The proposed sensor mat accordingly has two different switching thresholds which, depending on the requirements of the individual applications of the sensor mat can be set essentially independently of one another. As long as none or just one of the two first and second sensor cells of the sensor cell pair is triggered by an occupation situation, the output signal of the sensor mat can vary in a sensitive fashion depending on the size of the occupied seating area or depending on the force due to weight acting on the seating area. This sensitive variation of the output signal can be evaluated in the connected evaluation circuit in order to control activation of the restraint system precisely.

However, as soon as both the first and the second sensor cells are triggered, the output signal of the sensor mat abruptly changes and passes through the predefined threshold value. In the connected evaluation circuit, this behavior of the output signal can be assigned in a uniquely defined fashion to a specific occupation situation in which, in addition to the activation of the restraint systems, for example a seat-belt warning device is also activated. It is to be noted that the switching thresholds of the sensor mat can be set in such a way that the predetermined threshold value of the output signal is passed through only if the two sensor cells of the cell pair are activated. As a result, it is possible, for example, to rule out effectively the possibility of a seat-belt warning device being activated without a uniquely defined seat occupation situation being present.

It is to be noted that in one possible embodiment of the invention a relatively large number of sensor cells can be connected to one another in such a way that when a plurality of these cells are triggered simultaneously a predetermined threshold value of the output signal of the sensor mat is exceeded or undershot. It is thus possible, for example, to connect a parallel connection of a plurality of first sensor cells to a corresponding parallel connection of a plurality of second sensor cells in the way described above. In this case, the predetermined threshold value of the output signal can, for example, already be reached when the simultaneous triggering of in each case one of the first and one of the second sensor cells takes place.

In one possible embodiment of the invention, the first and second sensor cells are arranged in the direct vicinity of one another. In such an arrangement of the sensor cells, the predetermined threshold value is passed through only if a seat occupation in the region of the pair of sensor cells locally exceeds a predetermined activation threshold. In another possible embodiment, the first sensor cell is arranged in a first region of the sensor mat, and the second sensor cell is arranged in a second region of the sensor mat. The two sensor cells of the sensor cell pair can be arranged, for example, at an at least approximately equal distance from a center line of the seat running in the longitudinal direction of the vehicle, and at a certain distance from one another. This symmetrical arrangement of the switching elements with respect to the center line of the seat means that a seat occupation which is relevant for the seat-belt warning system is detected as such only if the occupation of the vehicle seat extends over a predetermined distance and if the occupation occurs at least approximately symmetrically with respect to the center plane of the seat. Local triggering of the seat occupation sensor, such as occurs, for example, as a result of the presence of an object such as, for example, as a result of a handbag which has been deposited on the seat, is not detected as seat occupation and the seat-belt warning system accordingly does not respond.

In a particularly simple embodiment of the invention, the first and second sensor cells are connected to one another by means of an individual connecting track. Such direct connection by means of an individual connecting track can be easily implemented in particular if the two sensor cells of the sensor cell pair are arranged at a small distance from one another. In contrast, if the sensor cells of the sensor cell pair are arranged in areas of the sensor mat which are at a distance from one another, it may possibly be advantageous if the first and second sensor cells are connected to one another by means of a connected evaluation circuit. In such an embodiment in which the individual sensor cells of the sensor cell pair are connected individually, i.e. in a matrix connection, to the evaluation circuit, there is no need to lay an individual connecting track over large areas of the sensor mat. In fact, the integration of such a connecting track with respect to crossovers of conductor tracks which are to be avoided can lead to insoluble problems, in particular if further functional elements such as, for example, antennas of a child's seat detection means are integrated into the sensor mat.

In one advantageous variant of the invention, the first and second sensor cells are each connected between a first and a second connecting conductor, and the first and second sensor cells are configured and connected to one another in such a way that when the first and the second sensor cell are triggered simultaneously, a short circuit is produced between the first and second connecting conductors. The short circuit which is produced when the two sensor cells are triggered can easily be sensed by the connected evaluation circuit as the value dropping below a low resistance threshold value.

The sensor cells of the sensor mat can be configured, for example, as pressure sensors with a pressure-dependent electrical resistance. In particular foil pressure sensors, which can be cost-effectively manufactured in the form of sensor mats, are suitable as pressure sensors. In such an embodiment, the output signal of the sensor mat is in principle dependent on the force due to weight acting on the sensor mat, with the overall resistance of the sensor cells or of the sensor mat decreasing as the force due to weight increases. According to the invention, in the present sensor mat at least two individual pressure sensors are then connected to form a sensor cell pair in such a way that when the two pressure sensors are triggered simultaneously the resistance value of the sensor mat drops below a certain threshold value independently of the triggering of the other pressure sensors. The two pressure sensors which are connected to form a sensor cell pair are preferably configured and connected to one another here in such a way that the simultaneous triggering of the two pressure sensors brings about a short circuit between the individual connecting lines so that the resistance value of the sensor mat drops to a value near to zero when the sensor cell pair is triggered.

In one possible embodiment of the invention with foil pressure sensors, the first sensor cell and the second sensor cell each comprise a first and a second electrode, which electrodes are arranged at a certain distance from one another on a first carrier foil, and a triggering layer which is arranged on a second carrier foil opposite the respective first and second electrodes in such a way that the triggering layer causes the first and second electrodes to make contact with one another as a function of the pressure when the first and second carrier foils are pressed together. The first sensor cell and the second sensor cell preferably each have a third electrode, wherein in the first sensor cell the third electrode is arranged opposite the first electrode on the second carrier foil, and wherein in the second sensor cell the third electrode is arranged opposite the second electrode on the second carrier foil, and wherein the third electrode of the first sensor cell is connected to the third electrode of the second sensor cell. As has already been described above, the third electrode of the first sensor cell and the third electrode of the second sensor cell can be connected to one another by means of a connected evaluation circuit or by means of an individual connecting track.

As a result of this arrangement of the third electrodes in the individual sensor cells and the described connection of the third electrodes to one another, the two first and second electrodes of the sensor cells are short-circuited if the two pressure sensors are triggered by means of the respective third electrodes and their connection, with the result that an abrupt drop in the resistance value of the sensor mat below a predetermined threshold value can be detected at the respective connecting lines.

BRIEF DESCRIPTION OF THE FIGURES

An embodiment of the invention will be described below with reference to the appended figures, in which.

DETAILED DESCRIPTION OF THE INVENTION

Figure 1:
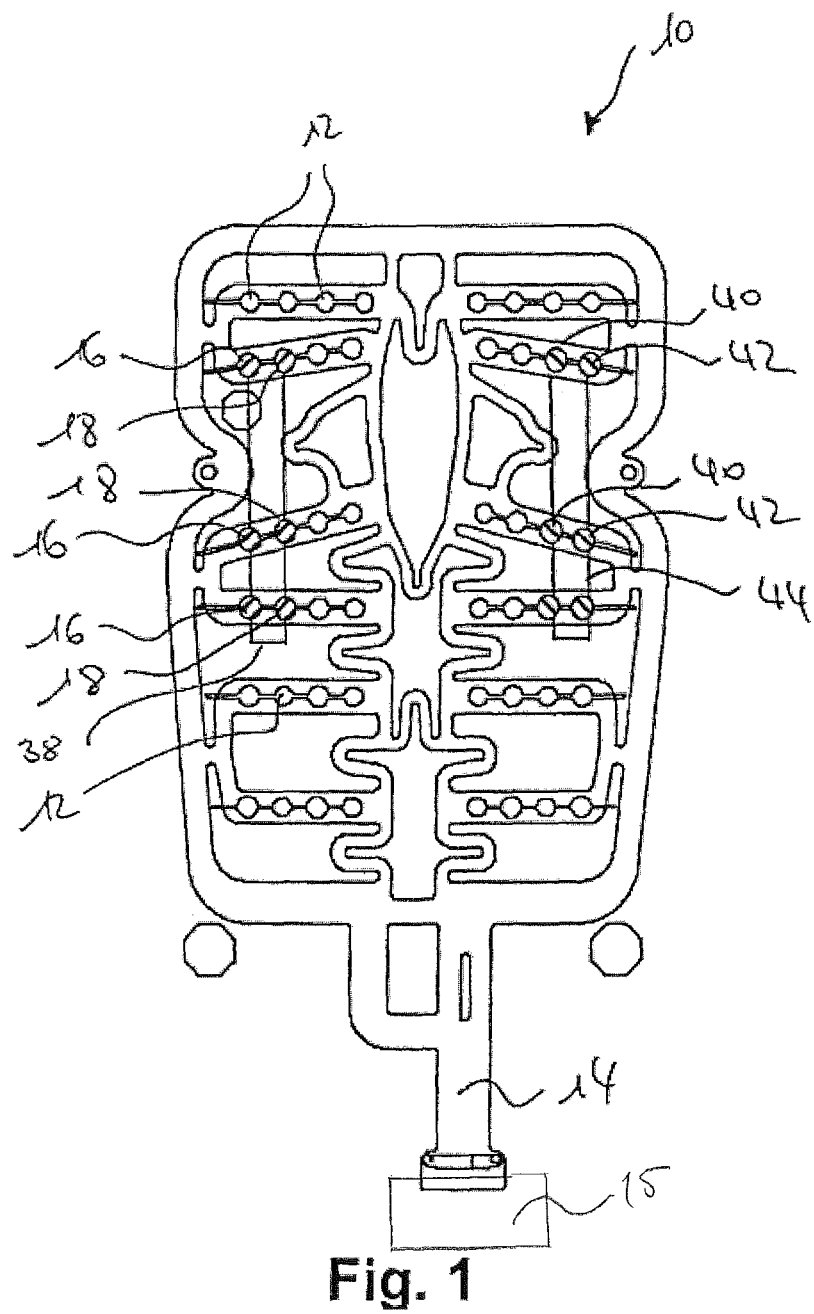
FIG. 1: is a schematic illustration of a first embodiment of a sensor mat according to the present invention.

A first embodiment of a sensor mat 10 is illustrated schematically in FIG. 1. Such a sensor mat 10 comprises, for example, a plurality of individual sensor cells 12 which are arranged with respect to one another in an arrangement which is predefined, for example, by a specific seat geometry. The individual sensor cells are embodied, for example, as foil pressure sensors which are applied between common carrier foils. Depending on the embodiment of the sensor mat, the individual sensor cells 12 are placed in contact with a connecting lug 14 of the sensor mat 10 either individually or combined in groups by means of connecting lines which run between the carrier foils. By means of this connecting lug 14, the sensor mat 10 can be connected to an evaluation circuit 15 in such a way that the switched states of the individual sensors or sensor groups can be determined.

In the embodiment of the sensor mat 10 which is illustrated in FIG. 1, a plurality of first sensor cells 16 and a plurality of second sensor cells 18 are connected to one another in such a way that when in each case at least a first sensor cell 16 and a second sensor cell 18 are triggered simultaneously independently of the triggering state of the other sensor cells, an output signal of the sensor mat 10 passes through a predetermined threshold value. In the case of an embodiment with foil pressure sensors, i.e. with pressure-dependent resistors, such a connection can be embodied, for example, in such a way that the resistance value of the sensor mat or of a group of sensor cells of the sensor mat drops to a resistance value near to zero.

Figure 3:
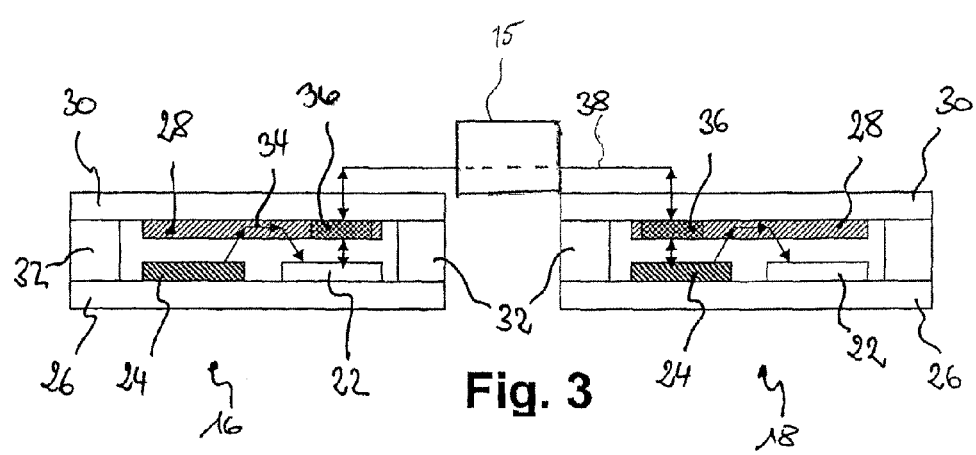
FIG. 3: shows a section through a possible embodiment of a foil pressure sensor pair.

One possible embodiment of a pair of foil pressure sensors which are connected in such a way is illustrated in FIG. 3. Each of the foil pressure sensors 16 and 18 comprises a first electrode 22 and a second electrode 24 which are applied to a first carrier foil 26 at a certain distance from one another. Furthermore, each of the foil pressure sensors 16 and 18 comprises a triggering layer 28 which is arranged opposite the respective first and second electrodes 22 and 24 on a second carrier foil 30. The first carrier foil 26 and the second carrier foil 30 are arranged with respect to one another by means of a spacer element 32 in such a way that when a switching cell is not triggered the triggering layer 30 cannot form electrical contact between the first and second electrodes, whereas when the first and second carrier foils are pressed together the triggering layer 28 places the first and second electrodes in contact with one another as a function of the pressure (illustrated by the current path 34).

Each of the two foil pressure sensors 16 and 18 also has a third electrode 36 which is respectively applied to the second carrier foil 30. In the first sensor cell 16, the third electrode 36 is arranged opposite the first electrode 22, while the third electrode 36 in the second sensor cell 18 is arranged opposite the second electrode 24. In order to connect the two sensor cells in a manner according to the invention, the respective third electrodes 36 are placed in contact with one another by means of a connecting track 38. If the first sensor cell 16 and the second sensor cell 18 are triggered simultaneously, the first electrode 22 in the first cell 16 and the second electrode 24 of the second cell 18 are placed in contact with one another by means of the third electrodes 36 which lie opposite one another, and by means of their connecting track 38, so that the resistance value between the two electrodes 22 and 24 drops to a value near to zero.

In the embodiment of the sensor mat which is illustrated in FIG. 1, the various first and second sensor cells 16 and 18 are connected to one another by means of their respective third electrodes using a continuous individual connecting track 38. It is to be noted that a sensor mat can have a plurality of sensor cell groups which are connected to one another. In the sensor mat 10 which is illustrated in FIG. 1, for example a further switching cell group with first and second switching cells 40 and 42 are connected to one another by means of a connecting track 44. The two switching cell groups are arranged symmetrically on each side of a center line of a sensor mat here.

Figure 2:
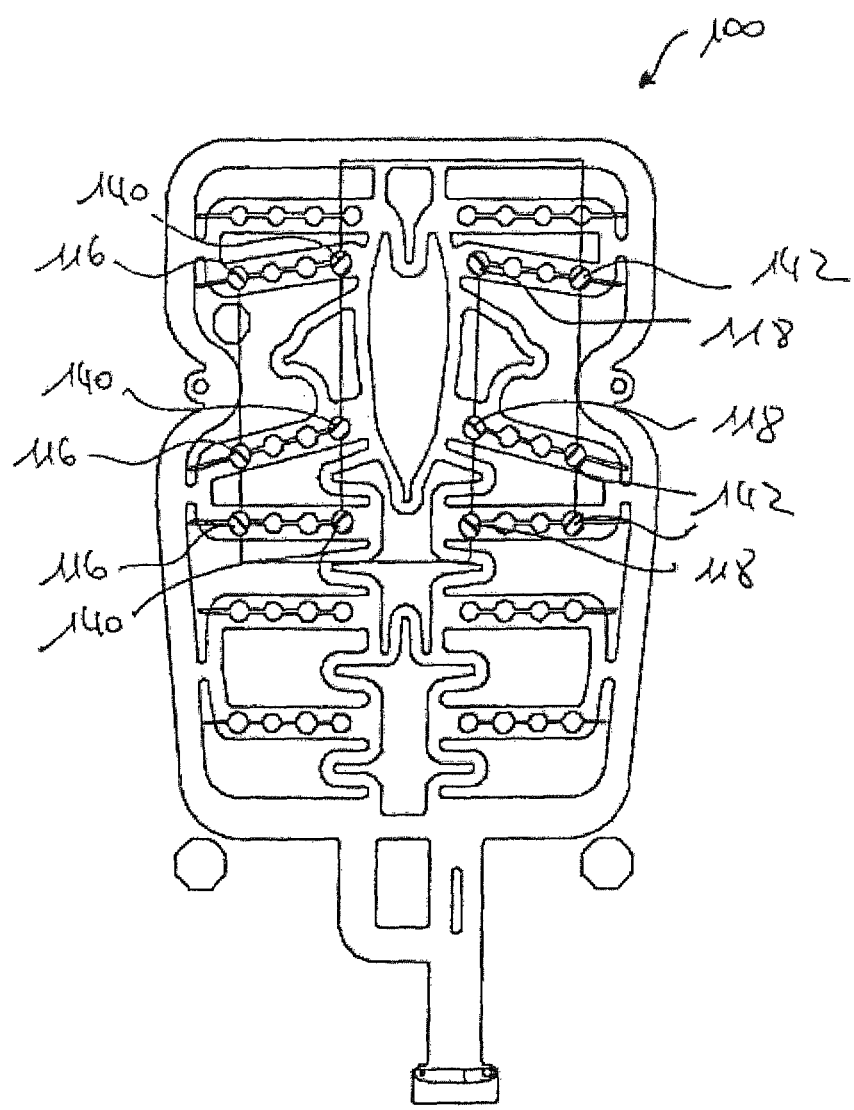
FIG. 2: is a schematic illustration of a second embodiment of a sensor mat according to the present invention.

A further embodiment of a sensor mat 100 is illustrated in FIG. 2. In this embodiment, the respective first sensor cells 116 and 140 and the second sensor cells 118 and 142 are not directly adjacent to one another but are instead each arranged in different regions of the sensor mat 100. The first and second sensor cells of each sensor cell group can be arranged, for example, at an at least approximately equal distance from a center line of the seat which runs in the longitudinal direction of the vehicle and at a certain distance from one another. As a result of this symmetrical arrangement of the switching elements with respect to the center line of the seat, a seat occupation which is relevant for the seat-belt warning system is detected as such only if the occupation of the vehicle seat extends over a predetermined distance and if the occupation occurs at least approximately symmetrically with respect to the center plane of the seat. Local triggering of the seat occupation sensor, such as occurs, for example, as a result of the presence of an object such as, for example, as a result of a handbag deposited on the seat, is not detected as seat occupation and the seat-belt warning system accordingly does not respond.

The invention claimed is:

1. A sensor mat for determining a seat occupation situation for a vehicle seat, comprising a plurality of sensor cells to be associated to a seating area of a vehicle seat, wherein the plurality of sensor cells are configured and interconnected in such a way that an output signal of the sensor mat varies as a function of the seat occupation situation, wherein said plurality of sensor cells comprises at least a plurality of first sensor cells and a plurality of second sensor cells, said plurality of first sensor cells and said plurality of second sensor cells being operatively connected to form a sensor cell group in such a way that, under normal operating conditions of the sensor mat, variation of said output signal of the sensor mat increases with a non-simultaneous triggering of at least one cell in either said plurality of first sensor cells or said plurality of second sensor cells, and said output signal of the sensor mat exceeds or drops below a predefined threshold value only if at least one sensor cell of the plurality of first sensor cells and at least one sensor cell of the plurality of second sensor cells are simultaneously triggered, wherein each of said plurality of first sensor cells and said plurality of second sensor cells includes a first electrode, a second electrode, and a third electrode, the third electrode of one of the plurality of first sensor cells being connected to the third electrode of one of the plurality of second sensor cells such that a short circuit is created between a coupled first electrode of one of the plurality of first sensor cells and second electrode of one of the plurality of second sensor cells when the one of the plurality of first sensor cells and the one of the plurality of second sensor cells is simultaneously triggered.

2. The sensor mat as claimed in claim 1, wherein the plurality of first sensor cells and the plurality of second sensor cells are arranged in the direct vicinity of one another.

3. The sensor mat as claimed in claim 1, wherein the plurality of first sensor cells are arranged in a first region of the sensor mat, and the plurality of second sensor cells are arranged in a second region of the sensor mat.

4. The sensor mat as claimed in claim 1, wherein the plurality of first sensor cells and the plurality of second sensor cells are interconnected via a connected evaluation circuit.

5. The sensor mat as claimed in claim 1, wherein the plurality of first sensor cells and the plurality of second sensor cells are interconnected by means of an individual connecting track.

6. The sensor mat as claimed in claim 1, wherein the plurality of first sensor cells and the plurality of second sensor cells are each connected between a first and a second connecting conductor, and wherein the plurality of first sensor cells and the plurality of second sensor cells are configured and interconnected in such a way that when one first and one second sensor cell are triggered simultaneously, a short circuit is produced between the first and second connecting conductors.

7. The sensor mat as claimed in claim 1, wherein the plurality of sensor cells is configured as pressure sensors with a pressure-dependent electrical resistance.

8. The sensor mat as claimed in claim 7, wherein the first and second electrode are arranged at a certain distance from one another on a first carrier foil, and a triggering layer is arranged on a second carrier foil opposite the respective first and second electrodes in such a way that the triggering layer causes the first and second electrodes to make contact with one another when the first and second carrier foils are pressed together.

9. The sensor mat as claimed in claim 8, wherein in the plurality of first sensor cells the third electrode is arranged opposite the first electrode on the second carrier foil, and wherein in the plurality of second sensor cells the third electrode is arranged opposite the second electrode on the second carrier foil, and wherein the third electrode in each of the plurality of first sensor cells is connected to the third electrode in each of the plurality of second sensor cells.

10. The sensor mat as claimed in claim 9, wherein the third electrode in the plurality of first sensor cells and the third electrode in the plurality of second sensor cells are connected to one another by means of a connected evaluation circuit.

11. The sensor mat as claimed in claim 9, wherein the third electrode in the plurality of first sensor cells and the third electrode in the plurality of second sensor cells are connected to one another by means of an individual connecting track.

* * * * *